United States Patent
Mednikov et al.

(10) Patent No.: US 6,762,922 B2
(45) Date of Patent: Jul. 13, 2004

(54) DEVICE AND METHOD FOR DETECTING THE POSITION OF AN OBJECT

(75) Inventors: Felix Mednikov, Ortenburg (DE); Stanislav Mednikov, Samara (RU); Mark Netschaewsky, Samara (RU); Günter Schallmoser, Ruhstorf (DE)

(73) Assignee: Micro-Epsilon Messtechnik GmbH & Co. KG, Ortenburg (DE)

( * ) Notice: Subject to any disclaimer, the term of this patent is extended or adjusted under 35 U.S.C. 154(b) by 13 days.

(21) Appl. No.: 10/322,109

(22) Filed: Dec. 17, 2002

(65) Prior Publication Data

US 2003/0098686 A1 May 29, 2003

Related U.S. Application Data

(63) Continuation of application No. PCT/DE01/03965, filed on Oct. 22, 2001.

(30) Foreign Application Priority Data

Oct. 20, 2000 (DE) .......................................... 100 52 278
Aug. 29, 2001 (DE) .......................................... 101 41 764

(51) Int. Cl.$^7$ ............................................... H01H 47/00
(52) U.S. Cl. ........................ 361/160; 361/152; 361/170
(58) Field of Search ................................ 361/160, 152, 361/170, 115, 100, 58

(56) References Cited

U.S. PATENT DOCUMENTS

| | | | | |
|---|---|---|---|---|
| 5,303,012 A | * | 4/1994 | Horlacher et al. | 335/253 |
| 5,841,621 A | | 11/1998 | Dean et al. | 361/143 |
| 6,016,778 A | | 1/2000 | Koch | 123/90.11 |
| 6,082,315 A | * | 7/2000 | Schneider | 123/90.11 |
| 6,246,230 B1 | | 6/2001 | Mednikov | 324/207.12 |
| 6,390,036 B1 | * | 5/2002 | Yuuki | 123/90.11 |

FOREIGN PATENT DOCUMENTS

| | | |
|---|---|---|
| DE | 198 56 528 A1 | 6/2000 |
| GB | 2 287 542 A | 9/1995 |
| WO | WO 98/04886 | 2/1998 |

* cited by examiner

Primary Examiner—Stephen W. Jackson
(74) Attorney, Agent, or Firm—Alston & Bird LLP

(57) ABSTRACT

A device and a method for detecting the position of an object (1), such as an armature (2) of an inlet or outlet valve (3), with the device comprising at least two coils (4, 5), preferably two magnet coils, which can be energized for moving the object (1) between the two coils (4, 5), or used with an evaluation circuit for detecting the position of the object (1). The two coils (4, 5) are alternately used for moving the object (1) between the coils (4, 5) and for detecting the position of the object (1).

35 Claims, 4 Drawing Sheets

DEVICE AND METHOD FOR DETECTING THE POSITION OF AN OBJECT

CROSS REFERENCE TO RELATED APPLICATION

This is a continuation of copending application PCT/DE01/03965, filed Oct. 22, 2001, which designates the U.S.

BACKGROUND OF THE INVENTION

The invention relates to a device and a method for detecting the position of an object, in particular, the armature of a valve, for example, an inlet and outlet valve, fuel injection valve, gas exchange valve, or the like, utilizing at least two coils, preferably two magnet coils, which can be energized for moving the object between the two coils.

Devices and methods for detecting the position of an object have been known from practice for a long time, for example, from DE 197 35 375 C1, and corresponding U.S. Pat. No. 6,016,778, which disclose a device for detecting the position of an object, namely an armature of a valve. The known device comprises a piezoelectric element for detecting the position of the armature of the valve, with the valve comprising two magnet coils, which can be energized for moving the object between the two coils. The detection of the position of the armature occurs indirectly by way of measuring the spring force between two springs, which hold the armature in a center position between two end positions, when the coils are not energized. By means of the piezoelectric element, it is thus possible to determine based on the spring force, the speed of the armature for adjusting with the signal generated by the piezoelectric element the circuit for controlling the magnet drive, so that a minimal impact speed of the armature is reached in its end position. Ideally, the springs have a linear characteristic, so that for this simplified case, the spring force changes in a linearly proportionate relationship with the position of the armature.

The known device is especially problematic in that the piezoelectric element permits detecting only the end positions of the armature. Other positions of the armature are computed indirectly via the characteristic of the springs. This leads to added errors in the detection of the position of the armature.

In addition, DE 198 56 528 A1 discloses, when viewed by itself, a valve lift sensor, which includes two stratified bodies. The stratified bodies are arranged at a distance with a space being formed therebetween. This space accommodates a Hall sensor. An object made as a sensor element is provided with a magnetic element and arranged for displacement relative to the Hall sensor. The Hall sensor operates in this case by the noncontacting method. The device disclosed in DE 198 56 528 A1 is especially problematic in that temperature changes on the Hall sensor are not compensated. In addition, the nonlinear output signal has a disadvantageous effect on the detection of the position of the object. Further disclosed are, when viewed alone, the transverse armature construction for sensors, as well as a detection by measuring current and inductance via the same coil.

It is therefore an object of the present invention to provide a device and a method for detecting the position of an object of the initially described type, wherein the position of the object can be detected with a simplest construction in a largely linear and troublefree way.

SUMMARY OF THE INVENTION

In accordance with the invention the foregoing object is accomplished by the device and method for detecting the position of an object wherein the two coils are alternately used for moving the object between the coils and for detecting the position of the object.

To begin with, it has been recognized by way of the present invention that additional means for detecting the position of an object, such as, for example, piezoelectric elements, are only inadequately suited for detecting the position of an object. By way of the present invention, it has furthermore been recognized that, departing from the practice of the past, i.e. the use of additional means, it is possible to accomplish a detection of the position of the object solely and alone by means of the two coils. In a technical respect, this is realized in a surprisingly simple manner, in that the two coils, which are normally used only and alone for moving the object between the coils, are now alternately used both for moving the object between the coils and for detecting the position of the object. This is accomplished, for example, in that while the one coil is used for moving the object, the other one is used for detecting the object, namely as a kind of eddy current sensor.

Within the scope of a particularly simple configuration, the object is arranged on a stem. This ensures a particularly uniform movement of the object, in particular when the object takes the form of an armature of a valve.

As regards a particularly robust and functional configuration, the coils could be arranged in at least one body. In a particularly advantageous manner, the body could be ferromagnetic.

As regards a particularly functional configuration, the object could be adapted for movement between two end positions. In this arrangement, the object could be held by means of at least one spring in a position, in particular an end position of the valve. In the case that the object is the armature of a valve, the position in which the object is held by means of the spring could very advantageously be the closing position of the valve. However, it would also be possible that the object is held by means of two springs in any position.

In a further advantageous manner, at least one coil could be subdivided into at least two sections. In this instance, the first section could be arranged closer to the object than the second section. In addition or as an alternative, the spacing between the second section and the object could be greater than half the diameter of the coil.

Preferably, the impedance of the first section could additionally be greater, in particular about three to five times greater than the impedance of the second section. In the case of such a configuration, the movement of the object would substantially influence only the impedance of the first section, with the impedance of the second section being largely independent of the position of the object.

Within the scope of a particularly simple configuration, the coil or coils could each include at least two contact points and at least one tap. In this connection, it would be possible to arrange the contact points and the tap at the end of the sections. This would especially simplify the energizing and the measuring of the impedance of the respective section.

In a particularly advantageous manner, the quality factor of the two sections of the coil could be the same, when the object is in an end position. In a particularly simple manner, the adaptation of the quality factor could be realized by adapting the ratio of the windings of the first and the second section.

With respect to a particularly simple circuit, at least one of the coils could form with an operational amplifier a voltage-current converter. In this instance, the first section of the coil could be supplied by the voltage-current converter, with the current being dependent on the impedance of the second section.

The tap between the first and the second section could connect to the inverting input of the operational amplifier. The noninverting input of the operational amplifier could connect in addition to a multiplexer. By means of the multiplexer, it would be possible to generate a voltage $U_{in}$, which could be, for example, a square-wave voltage.

In a particularly advantageous manner, the multiplexer could be controllable by means of a microcomputer or a quartz oscillator. The frequency of the microcomputer or quartz oscillator could be much higher, for example, 50 kHz to 250 kHz, than the frequency, at which the coil is activated for moving the object.

With respect to a particularly simple configuration, it would be possible to determine the voltage drop in the first section by means of an instrumental amplifier, with the relation being:

$$U_v = K \cdot U_{in} \cdot \left| \frac{Z_{s1}}{Z_{s2}} \right| \cdot e^{\gamma x}$$

where $U_{in}$ is the voltage at the noninverting input of the operational amplifier; $Z_{s1}$ the impedance of the first section, when the object is in its end position, in which the spacing between the coil and the object is minimal; $Z_{s2}$ the impedance of the second section, which is essentially independent of the distance of the object from the coil; K the amplification factor of the instrumental amplifier; and γ a coefficient, which is dependent on the geometry of the coil. The voltage $U_V$ at the output of the instrumental amplifier is thus dependent on the ratio of the impedances $Z_{s1}$ and $Z_{s2}$ of the first and second sections.

The output of the instrumental amplifier could connect to the input of a differentiator. The output of the differentiator could then have the voltage:

$$U_s = K \cdot \left[ U_{in} \cdot \frac{Z_{s1}}{Z_{s2}} \right] \cdot e^{\gamma x} \cdot e^{-t/\tau}$$

where τ is the time constant of the differentiator.

The output of the differentiator could connect to a comparator. This would make it possible to compare the output voltage of the differentiator $U_S$ by means of the comparator with a constant voltage $U_O$. At the output of the comparator, it will thus be possible to generate a pulse width-modulated signal, when the multiplexer is controlled by means of the microcomputer or quartz oscillator.

As an alternative, the output of the comparator could connect to a multivibrator, in particular a monostable multivibrator. The output signal of the multivibrator could then be used for controlling the multiplexer. In this case, the device would operate in the way of a free-swinging oscillator with a period $T=t_x+\Delta t$, where $\Delta t$ is the time constant of the monostable multivibrator.

In a particularly simple manner, it would then be possible to determine the position of the object by means of an evaluation circuit. This evaluation circuit could be realized in any form.

In accordance with the invention, the foregoing object is also accomplished by the method wherein the two coils are alternately used for moving the object between the coils and for detecting the position of the object.

With respect to a particularly reliable detection of the position of the object, the coil used for the detection could be supplied with a high-frequency current, preferably of a small amplitude. The impedance of the coil used for detecting the object would then be exponentially dependent on the distance of the object. Thus, the coil used for the detection would operate by the eddy current principle. In this connection, it is possible to determine the position of the object linearly and at the same time in a temperature stable manner and independently of fluctuations of the supply voltage. A temperature compensation could be realized in addition in a different way, for example, by means of the arrangement of a compensation coil.

At least one coil could form with at least one operational amplifier a voltage-current converter.

Within the scope of a particularly functional development, at least one coil could be subdivided into at least two sections. In this case, the first section could be arranged closer to the object than a second section, so that the position of the object could be determined by changing the impedance of the first section. The operating principle is thus based on the effect of the demagnetization action of eddy currents which are induced in the object by the electromagnetic field of the coil. This results in that the impedance of the first section of the coil changes considerably with the movement of the object. At the same time, the impedance of the second section changes relatively little with respect to the location of the object, since it is arranged adequately removed from the object. The first section of the coil could be supplied by a source of current, namely the voltage-current converter that is formed by the coil and the operational amplifier. In this instance, the current would be dependent on the impedance of the second section.

The voltage drop in the first section could be determined by means of an instrumental amplifier, with the relation being:

$$U_s = U_o = K \cdot \left[ U_{in} \cdot \left| \frac{Z_{s1}}{Z_{s2}} \right| \right] \cdot e^{\gamma x} \cdot e^{-t_0(x)/\tau}$$

The output of the instrumental amplifier could then be connected to the input of a differentiator. At the output of the differentiator, the voltage would thus be:

$$U_s = K \cdot \left[ U_{in} \cdot \left| \frac{Z_{s1}}{Z_{s2}} \right| \right] \cdot e^{\gamma x} \cdot e^{-t_0(x)/\tau}$$

where τ is the time constant of the differentiator.

The output of the differentiator could then be connected to a comparator, so that the voltage at the output of the differentiator:

$$U_s = U_o = K \cdot \left[ U_{in} \cdot \left| \frac{Z_{s1}}{Z_{s2}} \right| \right] \cdot e^{\gamma x} \cdot e^{-t_0(x)/\tau}$$

is compared by means of the comparator with a constant voltage $U_O$.

For certain positions of the object, only signals of the duration $t_0(x)$ are applied to the output of the comparator. Thus, the time is proportionate to the position of the object, namely:

$$t_0(X) = \tau \cdot \ln \cdot \left[ K \cdot \frac{U_{in}}{U_o} \cdot \left| \frac{Z_{s1}}{Z_{s2}} \right| \right] + \gamma X$$

By means of changing the constant voltage and/or the time constants, it would then be possible to adjust the values of the time.

There exist various possibilities of improving and further developing the teaching of the present invention in an advantageous manner. To this end, one may refer to the following detailed description of preferred embodiments of the device and the method in accordance with the invention for detecting the position of an object with reference to the drawing. In conjunction therewith, generally preferred improvements and further developments of the teaching are explained.

DETAILED DESCRIPTION OF THE PREFERRED EMBODIMENTS

Figure 1:
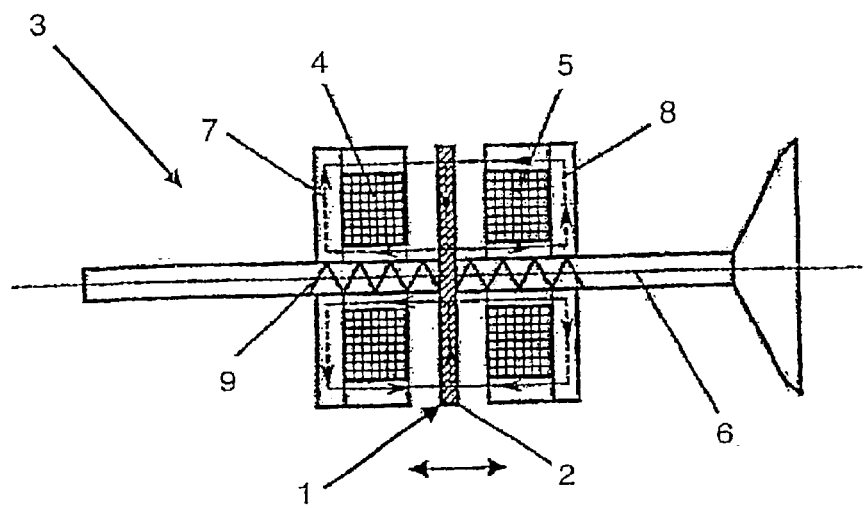
FIG. 1 is a schematic view of an embodiment of a portion of the device in accordance with the invention for detecting the position of an object, namely the position of a valve.

FIG. 1 shows an embodiment of a portion of a device according to the invention for detecting the position of an object 1, namely an armature 2 of a valve 3. The valve 3 comprises two coils 4, 5, in the present case magnet coils, which are energized for moving the armature 2 between the coils 4 and 5.

According to the present invention, the two coils 4, 5 are alternately used for moving the armature 2 between the coils 4, 5 and for detecting the position of the armature 2.

The armature 2 is arranged on a stem 6, and the coils 4, 5 are arranged in two ferromagnetic bodies 7, 8. The armature 2 is movable by means of the two coils 4, 5 between two end positions, namely an opened and a closed position of the valve, and it is held by means of a spring 9 in the position, in which the valve 3 is closed. The two coils 4, 5 are alternately energized for moving the armature 2 between the coils 4, 5 and for thus opening and closing the valve 3.

When the coil 4 is energized for moving the armature 2, the coil 5 is additionally used for determining the position of the armature 2, and vice versa. When the armature 2 is in the respective end position, and the holding current in the respective coil 4, 5 is cut off, so that the relaxing spring 9 causes the armature 2 to move in the direction toward the other end position, the coil 4, 5 is supplied with a high-frequency current.

Figure 2:
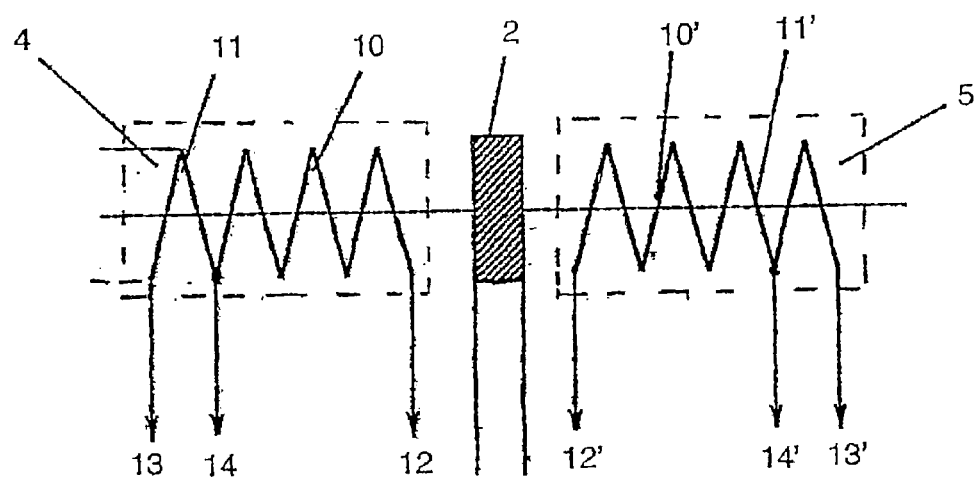
FIG. 2 is a schematic cutout view of the coils of the valve of FIG. 1.

As shown in FIG. 2, the coils 4, 5 are each subdivided into two sections 10, 11, 10', 11'. The first section 10, 10' is arranged closer to the armature 2 than the second section 11, 11'. To make the second section 11, 11' in addition even more independent of the position of armature 2, the spacing between the second section 11, 11' and the armature 2 is greater than half the diameter of the coils 4, 5. In addition, the impedance of the first section 10, 10' is selected in the present case about four times greater than the impedance of the second section 11, 11'.

The coils 4, 5 have each two contact points 12, 12', 13, 13' and a tap 14, 14', which are arranged in the respective end points of the sections 10, 11, 10', 11'.

Figure 3:
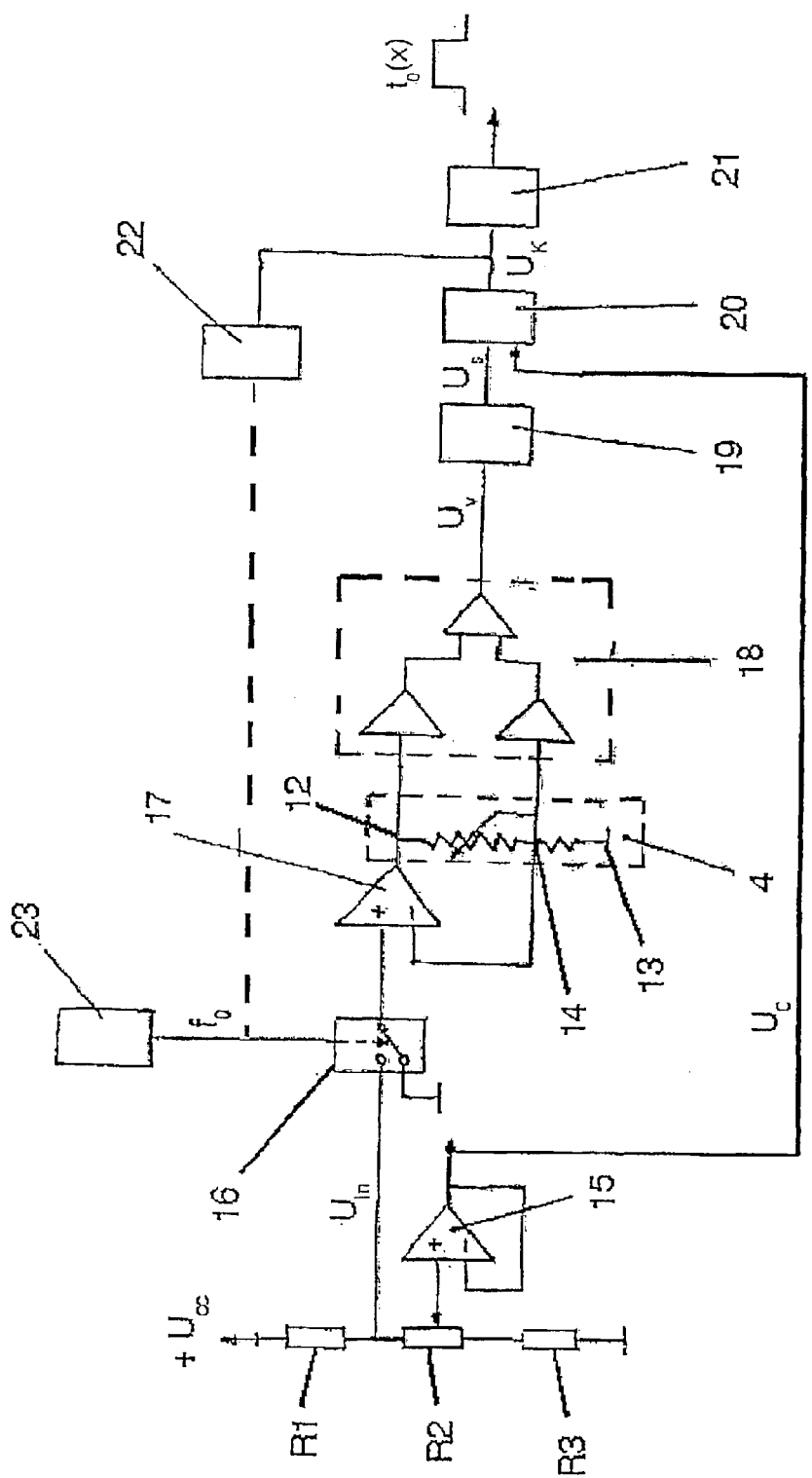
FIG. 3 is a schematic view of a circuit diagram of a device according to the invention.

To determine the position of an armature 2 that is moved between the coils 4, 5, a circuit as shown in FIG. 3, includes a voltage divider of three resistors R1, R2, and R3, with the voltage divider being supplied by a source of voltage $U_{CC}$.

With the aid of an operational amplifier 15 and the resistor R2 in the form of a potentiometer, a reference voltage $U_O$ is generated. Between the resistors R1 and R2, a voltage $U_{in}$ is tapped, which is supplied to the input of a multiplexer 16, whose second input connects to ground.

The output of multiplexer 16 connects to a voltage-current converter, which comprises the coils 4, 5 and an operational amplifier 17. In this arrangement, the output of multiplexer 16 connects to the noninverting input of the operational amplifier 17, with the inverting input of the operational amplifier 17 connecting to the tap 14 of coil 4, whose contact point 12 connects to the output of operational amplifier 17, and whose contact point 13 connects to ground.

The voltage drop between contact point 12 and tap 14 of the coil 4 is tapped by means of an instrumental amplifier 18, and connected via a capacitor (not shown) to the inverting input of a differentiator 19, with the output of the instrumental amplifier 18 connecting via a resistor (not shown) to the inverting input of the differentiator 19.

The output of the differentiator 19, to which a voltage $U_S$ is applied, connects to the noninverting input of a comparator 20, whose inverting input connects to the output of operational amplifier 15, with the reference voltage $U_O$ being applied. The output of comparator 20 connects with the input of a Schmitt trigger 21. At the output thereof, a time interval is generated, which is proportionate to the position of armature 2.

In a different embodiment likewise shown in FIG. 3, the output of comparator 20 connects via a monostable multivibrator 22 to the control input of multiplexer 16. The control input of multiplexer 16 connects to a square-wave oscillator, in the present embodiment a microcomputer 23. The microcomputer 23 controls the multiplexer 16 with a square-wave signal of the frequency $f_O$. In the first half period of the square-wave signal, an input of multiplexer 16 connects to the voltage divider formed by resistors R1, R2, and R3, and in the second half period of the square-wave signal, the same input of multiplexer 16 connects to ground. In this process, the frequency $f_O$ has a value of about 50 to 250 kHz. In a second embodiment, the control input of the multiplexer 16 connects to the output of monostable multivibrator 22.

Figure 4:
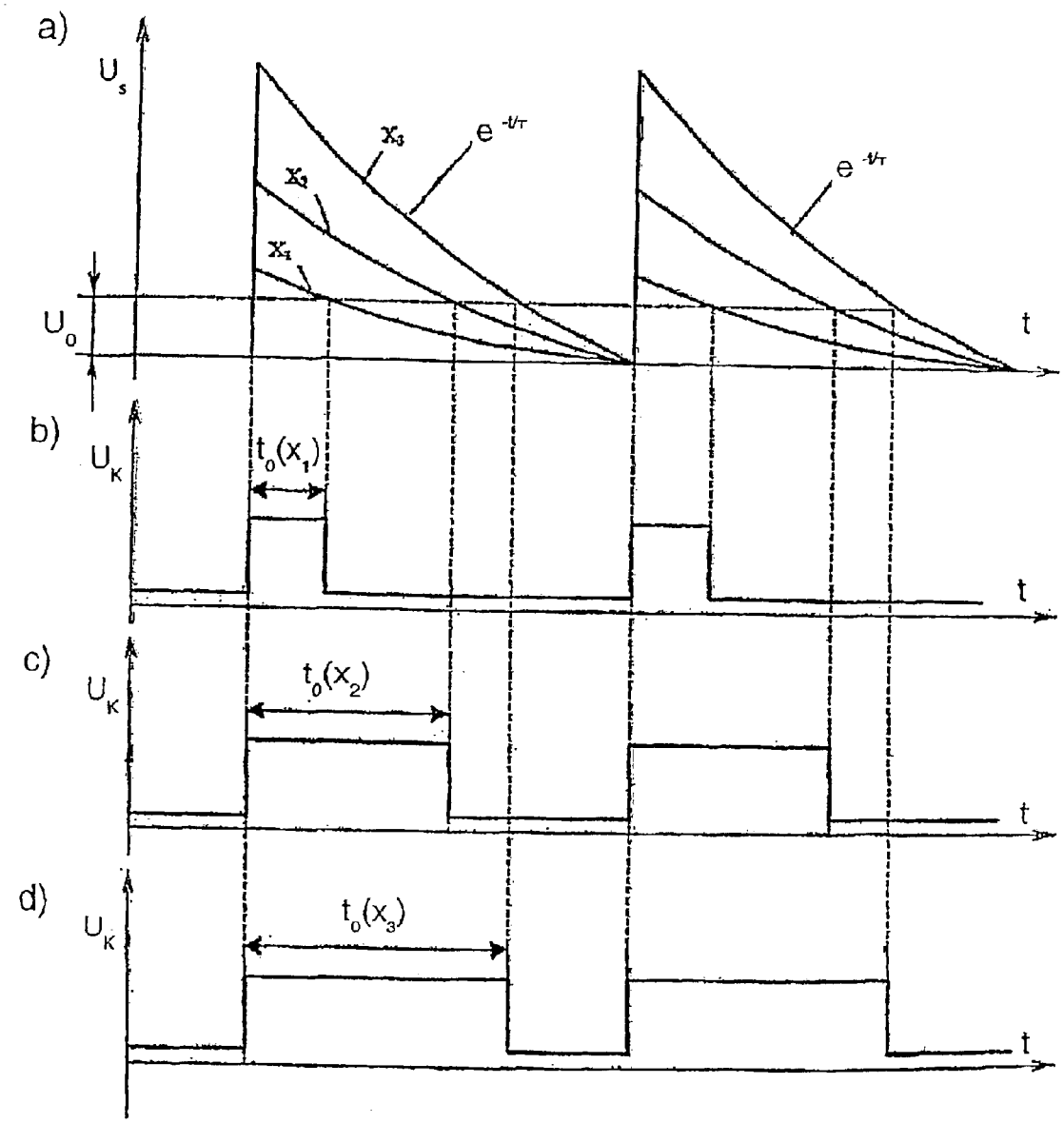
FIG. 4 is a schematic view of the time variation of the voltages for different positions of the object in a first embodiment.

FIG. 4 illustrates the dependency of the voltage $U_S$ at the output of operational amplifier 19 on the time t for three different positions of the armature $x_1$, $X_2$, $X_3$. The voltage $U_S$ is compared by means of comparator 20 with the voltage $U_O$. Applied to the output of comparator 20 are signals of the duration $t_0(x_1)$, $t_0(x_2)$ and $t_0(x_3)$, each shown in FIGS. 4b, 4c, and 4d, for the three different positions of the armature 2. As a result of the constant frequency $f_O$ of the supply voltage, a signal with a pulse width modulation is generated by the distance-dependent duration $t_0(x)$.

Figure 5:
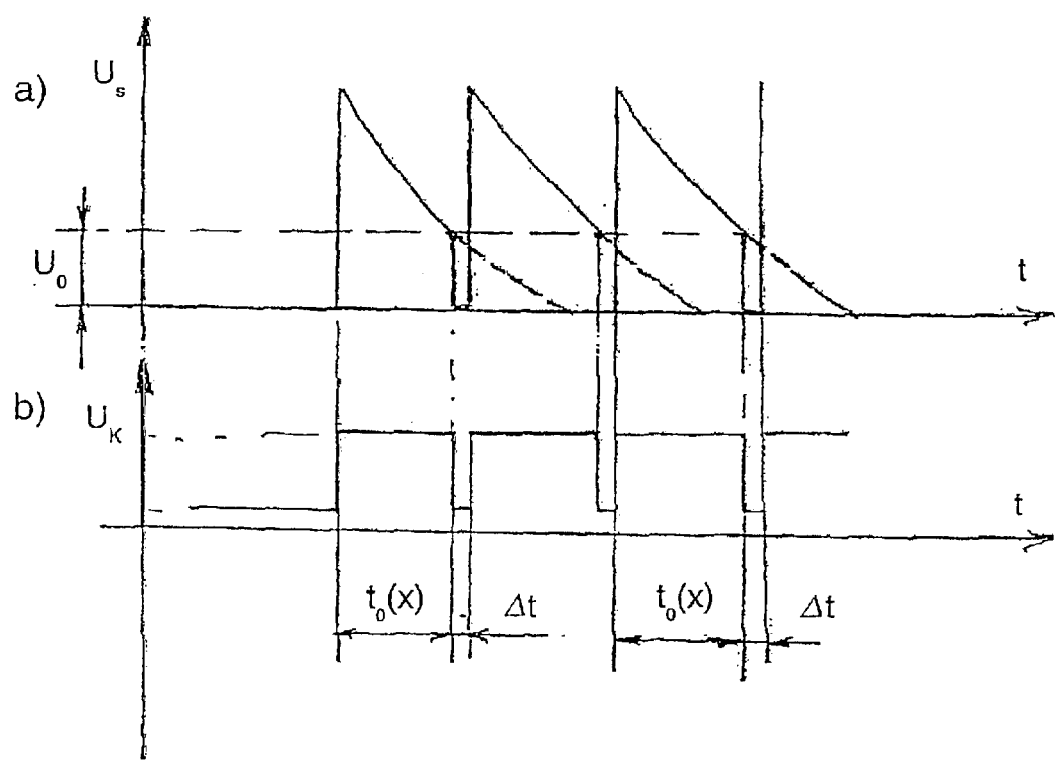
FIG. 5 is a schematic view of the time variation of the voltages for different positions of the object in a second embodiment.

FIG. 5 shows the dependency of the voltage $U_S$ on the time for a position $x_1$ of the armature 2 in a second embodiment of the device according to the invention. When the voltage $U_S$ is equal to the reference voltage $U_O$, a signal $U_K$ with the duration $t_0(x_1)$ is generated at the output of comparator 20.

The downward slope of voltage UK is used to control the monostable multivibrator 22, which switches after the constant time Δt. At this time, the supply to coil 4 or 5 is interrupted, and then restarted by multiplexer 16. This embodiment of the invention offers the advantage of a high measuring speed, since the arrangement operates in the way of a free swinging oscillator, and is not tied to a frequency $f_O$ that can be predetermined constant. Thus, the output signal is a mere time interval $T=t_x+\Delta t$, which is used to realize a frequency modulation.

As regards further details, the general description is herewith incorporated by reference for purposes of avoiding repetitions.

Finally, it should be explicitly remarked that the above-described embodiments are used only for explaining the claimed teaching, without however limiting it to the described embodiment.

What is claimed is:

1. A device for detecting the position of an object, comprising
   first and second coils mounted to define a space therebetween,
   said object being mounted within said space for movement between a first end position adjacent the first coil and a second end position adjacent the second coil, and
   a circuit connected to the coils so that the coils may be alternately used to move the object between the end positions and detect the position of the object.

2. The device of claim 1, wherein the object is arranged on a stem of a valve.

3. The device of claim 2, wherein the coils are arranged in at least one ferromagnetic body.

4. The device of claim 3, wherein the object is held by means of a spring in a predetermined position.

5. The device of claim 1, wherein each coil is subdivided into at least two sections, with the first section being arranged closer to the object than the second section.

6. The device of claim 5, wherein the spacing between the second section and the object is greater than half the diameter of each coil.

7. The device of claim 5, wherein the impedance of the first section is greater than the impedance of the second section.

8. The device of claim 5, wherein at least one coil comprises at least two contact points and at least one tap positioned between the sections.

9. The device of claim 5, wherein in that the quality factor of the two sections of the coil is the same when the object is in an end position.

10. The device of claim 9, wherein an adaptation of the quality factor is achieved by adapting the ratio of the number of windings of the first section and the second section.

11. The device of claim 5, wherein at least one of the coils forms with at least one operational amplifier a voltage-current converter.

12. The device of claim 8, wherein the tap between the first section and the second section connects to an inverting input of the operational amplifier.

13. The device of claim 12, wherein a multiplexer connects to a noninverting input of the operational amplifier.

14. The device of claim 13, wherein the multiplexer is controllable by means of a microcomputer or a quartz oscillator.

15. The device of claim 14, wherein the frequency of the microcomputer or quartz oscillator is much higher than the frequency of the current that is used for activating the coil for moving the object.

16. The device of claim 15, wherein the voltage drop on the first section is detectable by means of an instrumental amplifier, with a relation being:

$$U_v = K \cdot U_{in} \cdot \left| \frac{Z_{s1}}{Z_{s2}} \right| \cdot e^{\gamma x}.$$

17. The device of claim 16, wherein the output of the instrumental amplifier connects to the input of a differentiator.

18. The device of claim 17, wherein the output of the differentiator has a voltage:

$$U_s = K \cdot \left[ U_{in} \cdot \frac{Z_{s1}}{Z_{s2}} \right] \cdot e^{\gamma x} \cdot e^{-t_0(x)/\tau}.$$

19. The device of claim 18, wherein the output of the differentiator connects to a comparator.

20. The device of claim 19, wherein the output of the comparator is configured to generated a pulse width modulated signal.

21. The device of claim 20, wherein the output of the comparator connects to a monostable multivibrator.

22. A device of claim 21, wherein the multiplexer is controllable by means of the output signal of the multivibrator.

23. A method for detecting the position of an object, comprising the steps of:
   mounting the object within a space provided between first and second coils for movement between a first end position adjacent the first coil and a second end position adjacent the second coil, and
   alternately (1) energizing the first coil so as to move the object to one of the end positions while the second coil detects the position of the object, and (2) energizing the second coil so as to move the object to the other end position while the first coil detects the position of the object.

24. The method of claim 23, wherein the coil used for detecting the position of the object is supplied with a high-frequency current of a relatively small amplitude.

25. The method of claim 23, wherein the impedance of the coil used for detecting the position of the object is exponentially dependent on the distance of the object.

26. The method of claim 23, wherein each coil forms with an operational amplifier a voltage-current converter.

27. The method of claim 23, wherein the coils are subdivided into at least two sections, and wherein the first section is arranged closer to the object than the second section, and wherein the position of the object is determined by changing the impedance of the first section.

28. The method of claim 27, wherein the impedance of the second section of the coil is substantially independent of the change in position of the object.

29. The method of claim 27, wherein the first section is supplied by a source of current, and wherein the current flowing in the first section is dependent on the second section.

30. The method of claim 27, wherein the voltage drop ($U_V$) in the first section is determined by means of an instrumental amplifier, with a relation being:

$$U_v = K \cdot U_{in} \cdot \left| \frac{Z_{s1}}{Z_{s2}} \right| \cdot e^{\gamma x}.$$

31. The method of claim 30, wherein the output of the instrumental amplifier is connected to the input of a differentiator.

32. The method of claim 31, wherein the voltage:

$$U_s = K \cdot \left[ U_{in} \cdot \left| \frac{Z_{s1}}{Z_{s2}} \right| \right] \cdot e^{\gamma x} \cdot e^{-t_0(x)/\tau}.$$

is applied to the output of the differentiator.

33. The method of claim 32, wherein the output of the differentiator is connected to a comparator, and wherein the voltage at the output of the differentiator:

$$U_s = U_o = K \cdot \left[ U_{in} \cdot \left| \frac{Z_{s1}}{Z_{s2}} \right| \right] \cdot e^{\gamma x} \cdot e^{-t_0(x)/\tau}$$

is compared by means of the comparator with a constant voltage ($U_O$).

34. The method of claim 33, wherein the time ($t_0(x)$) is proportionate to the position of the object (1), namely:

$$t_0(x) = \tau \cdot \ln \cdot \left[ K \cdot \frac{U_{in}}{U_0} \cdot \left| \frac{Z_{s1}}{Z_{s2}} \right| \right] + \gamma x.$$

35. The method of claim 34, wherein the values of the time ($t_0(x)$) are adjusted by means of changing the constant voltage ($U_O$) and/or the time constants ($\tau$).

\* \* \* \* \*